Nov. 8, 1960 C. E. HAJNY 2,959,650
FLUID CONDUCTOR MOTOR OPERATED CONTROL DEVICES
AND APPARATUS EMPLOYING THE SAME
Filed Nov. 30, 1956 3 Sheets-Sheet 1

INVENTOR.
Charles E Hajny
BY
Seegert & Schwalbach
Attys

Nov. 8, 1960 C. E. HAJNY 2,959,650
FLUID CONDUCTOR MOTOR OPERATED CONTROL DEVICES
AND APPARATUS EMPLOYING THE SAME
Filed Nov. 30, 1956 3 Sheets-Sheet 2

INVENTOR.
Charles E. Hajny
BY
Seegert & Schwalbach
Attys

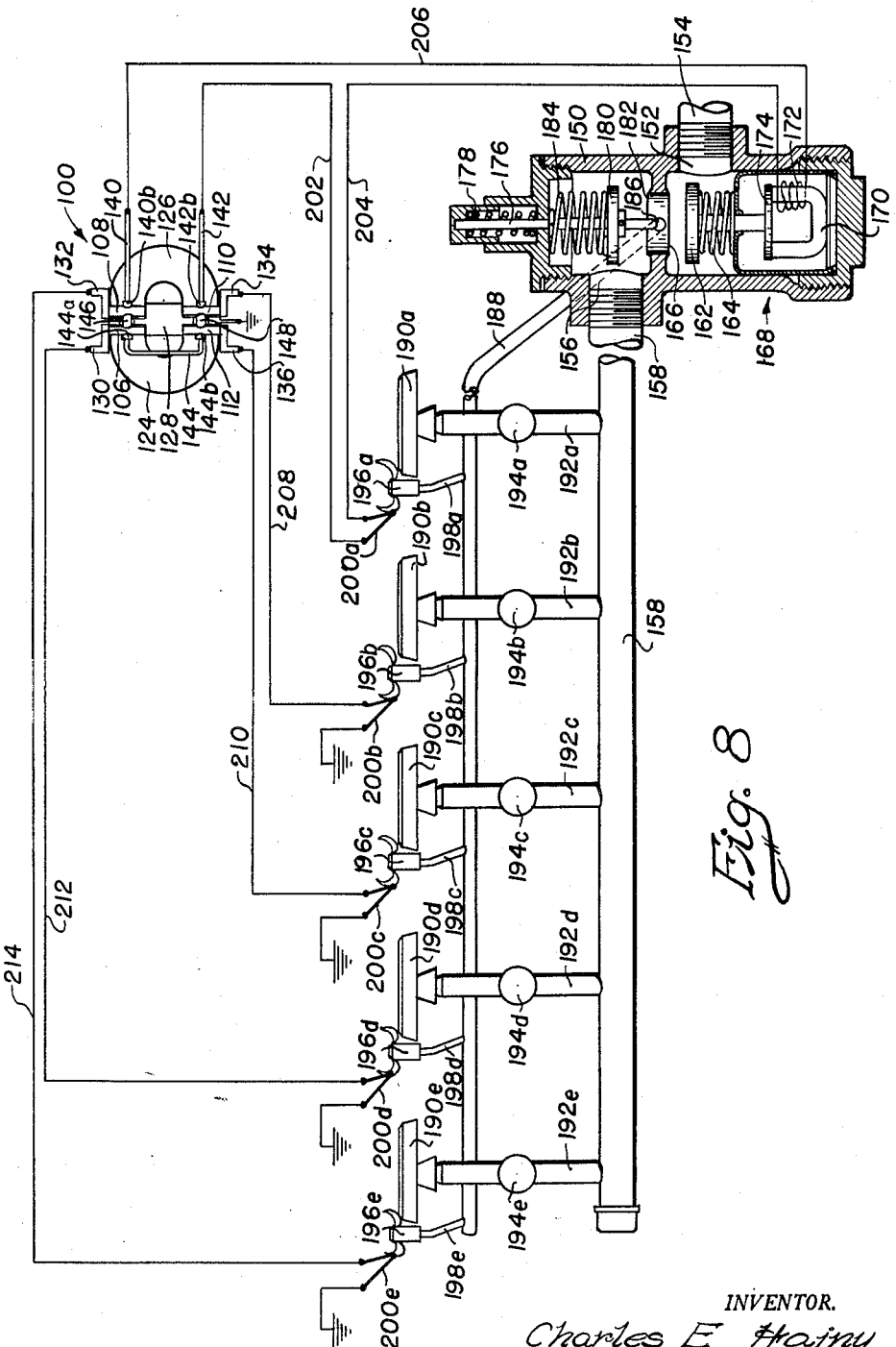

United States Patent Office 2,959,650
Patented Nov. 8, 1960

2,959,650

FLUID CONDUCTOR MOTOR OPERATED CONTROL DEVICES AND APPARATUS EMPLOYING THE SAME

Charles E. Hajny, Milwaukee, Wis., assignor to Baso Inc., a corporation of Wisconsin Filed Nov. 30, 1956, Ser. No. 625,403

2 Claims. (Cl. 200—112)

This invention relates to fluid conductor motor operated control devices and to apparatus employing such devices. More particularly, the present invention teaches the construction of novel circuit controlling devices having fluid conductor motors, for example, mercury pumps for completing and interrupting one or more electrical circuits in accordance with energization of such motors.

An object of this invention is to provide a circuit controlling device having a fluid conductor motor which is energizable to move electrically conductive fluid into bridging engagement with a pair of cooperating electrical contacts.

Another object is to provide a circuit controlling device as characterized above having an endless fluid passageway wherein electrically conductive fluid is continually circulated during energization of the fluid conductor motor, and wherein electrical contacts are positioned in fixed spacial relation within said passageway for electrical bridging by such fluid during circulation of the latter in said passageway.

Another object is to provide a circuit controlling device which is hermetically sealed for complete protection of the various components from the deleterious effects of foreign materials.

Another object is to provide a circuit controlling device as characterized above wherein the magnetic flux path means of the fluid conductor motor also serves as electrical current path means for flow of electrical current through the electrically conductive fluid.

Another object of this invention is to provide a circuit controlling device having a plurality of pairs of contacts in series circuit arrangement for insertion in a circuit to be controlled, there being a fluid passageway and a fluid conductor motor for each of said pairs of contacts separately energizable to move electrically conductive fluid into engagement with the respective pair of contacts, whereby connection of said motors to separate sources of electric power and insertion of said series circuit arrangement in a circuit to be controlled, renders the latter responsive to all of said sources of electric power.

Another object of the present invention is to provide fluid fuel burning apparatus comprising a plurality of fuel burners and a single shut-off valve for all of said burners, there being control means associated with said shut-off valve and responsive to outage of any one of said fuel burners to cause said shut-off valve to terminate fuel flow to all of said fuel burners.

Another object is to provide fluid fuel burning apparatus as characterized above, wherein the control means comprises a fluid conductor motor operated switch for each of said burners, said switches being connected in circuit with said shut-off valve and being individually responsive to outage of the flame at the respective fuel burner to deenergize said shut-off valve and interrupt fuel flow to all of said burners.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Figure 4 is a sectional view of a second embodiment of the present invention, taken through the fluid conductor motor;

Figure 5 is a sectional view of the second embodiment, taken through the plurality of cooperating contacts;

Figure 6 is a sectional view of the second embodiment, taken substantially along line 6—6 of Figure 4;

Figure 7 is a sectional view of the second embodiment, taken substantially along line 7—7 of Figure 4; and Figure 8 is a more or less schematic showing of the second embodiment in fluid fuel burning apparatus.

Like reference characters indicate corresponding parts throughout the several views of the drawings.

Figure 1:
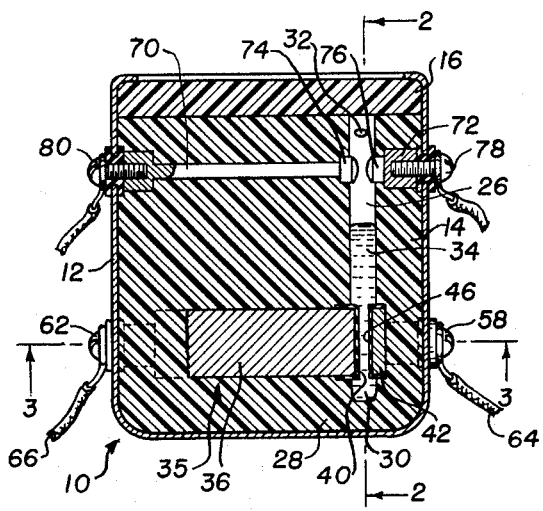
Figure 1 is a sectional view of a first embodiment of the present invention, taken substantially along line 1—1 of Figure 3.
Figure 2:
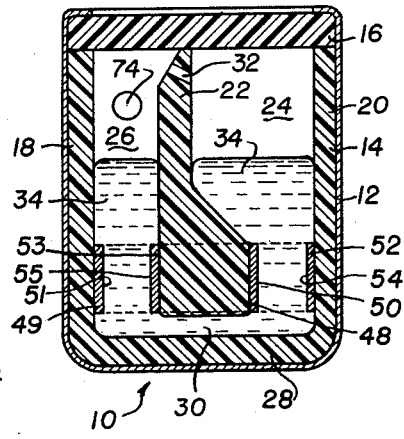
Figure 2 is a sectional view of the first embodiment, taken substantially along line 2—2 of Figure 1.
Figure 3:
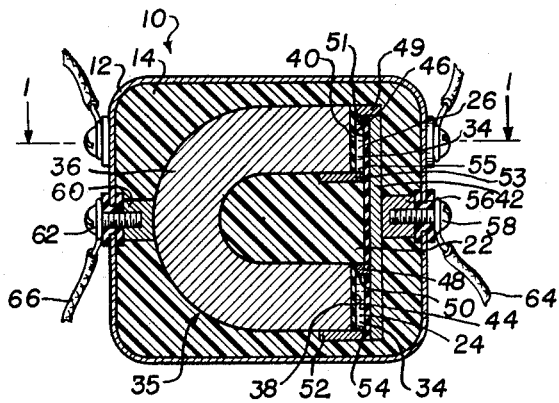
Figure 3 is a sectional view of the first embodiment, taken substantially along line 3—3 of Figure 1.

Referring to Figures 1, 2 and 3 of the drawings, they show a novel circuit controlling device or switch 10 comprising a container or enclosure 12 for a switch body portion 14 and a switch cover portion 16 of relatively inert electrical insulating material. Body portion 14 is formed with side walls 18 and 20 and a partition wall 22 providing a fluid reservoir 24 and a fluid passageway 26. Body portion 14 is also formed with a bottom end wall 28 spaced from partition wall 22 to provide a passageway 30 which affords communication between reservoir 24 and passageway 26. A through opening 32 is formed in the upper portion of partition wall 22 in communication with reservoir 24 and passageway 26. As shown in Figures 1 and 2, such endless passageway is partially filled with an electrically conductive fluid, such as mercury 34.

A fluid conductor motor or mercury pump 35 for circulating the mercury 34 in the endless fluid passageway is provided in switch body 14 and comprises a U-shaped magnet core member 36 formed with magnet pole faces 38 and 40 positioned respectively within reservoir 24 and passageway 26. Core member 36 may take the form of a permanent magnet, as chosen for illustration in Figures 1, 2 and 3, or it may take the form of a core member for an electromagnet if desired. For completing the magnetic circuit from one to another of the pole faces 38 and 40 of core member 36 is a magnetic member 42 formed of magnetically permeable material positioned within reservoir 24 and passageway 26, said member 42 being formed with magnet pole faces 44 and 46 in fixed spacial relation with pole faces 38 and 40 respectively of core member 36. Thus, with core member 36 taking the form of a permanent magnet, magnetic flux flows from the lower leg of core member 36 (Figure 3) through the mercury 34 between magnet pole faces 48 and 44, through magnetic member 42, and the mercury 34 between magnet pole faces 46 and 40 to the upper leg of core member 36.

Fixed, as by welding or soldering, to core member 36 adjacent magnet pole faces 38 and 40 respectively, are electrical pole members 48 and 49 formed of copper and having electrical pole faces 50 and 51 exposed to the mercury 34 in reservoir 24 and passageway 26 respectively. Fixed to magnet member 42 are electrical pole members 52 and 53 formed of copper and having pole faces 54 and 55 exposed to the mercury 34 within reservoir 24 and passageway 26 respectively in fixed spacial relation with electrical pole faces 50 and 51 respectively. A current conductor 56 is fixed to magnet member 42 in any suitable manner as by welding or soldering. A binding post or terminal member 58 is insulatedly positioned within an opening formed in enclosure 12 and has threaded engagement with conductor 56 to afford electrical continuity therebetween. A current conductor 60 is fixed to magnet core 36. A binding post or terminal member 62 is insulatedly positioned within an opening formed in enclosure 12 and has threaded engagement with conductor 60 to afford electrical continuity therebetween.

As indicated in Figures 1, 2 and 3, binding posts 58 and 62 afford means for connecting the fluid conductor motor or mercury pump 35 to a source of electrical energy (not shown) as by lead connectors 64 and 66. Thus, with terminals 58 and 62 connected to opposite sides of a source of electrical power, current flows from terminal 62 through conductor 60 into magnet core member 36. The current in the lower leg of core member 36 (Figure 3) flows through electrical pole member 52, through the mercury 34 between electrical pole faces 54 and 50, through electrical pole member 48, magnetic member 42, and conductor 56 to terminal 58. The current in the upper leg of core member 36 flows through pole member 53, the mercury 34 between pole faces 55 and 51, pole member 49, magnetic member 42, and conductor 56 to terminal 58.

To prevent current flow from the mercury in reservoir 24 and passageway 26 to the magnet pole faces of the soft iron core member 36 and magnetic member 42, I prefer to coat the magnet pole faces 38, 40, 44 and 46 with insulating material such as ceramic or plastic material as shown in Figures 1 and 3. Further, since mercury is very active chemically with copper of which the electrical poles are constructed, I prefer to coat the electrical pole faces 50, 51, 54 and 55 with an inert material such as rhodium to prevent amalgamation between the mercury and the copper.

Positioned within switch body portion 14 in an elevated position with respect to mercury pump 35, are electrical contact members 70 and 72 affording oppositely disposed contacts 74 and 76 in fixed spacial relation within passageway 26. A binding post or terminal member 78 is insulatedly positioned within an opening formed in enclosure 12 and has threaded engagement with contact member 72 to afford electrical continuity therebetween. A binding post or terminal member 80 is insulatedly positioned within an opening formed in enclosure 12 in threaded engagement with contact member 70 to afford electrical continuity therebetween. As indicated in Figures 1 and 3, terminals 78 and 80 provide means for connecting contacts 74 and 76 in any given electrical circuit to be controlled by circuit controlling device 10.

The operation of the first embodiment of the present invention will now be described:

With mercury pump 35 disconnected from its source of electrical power, the electrically conductive fluid 34 seeks its own level within reservoir 24 and passageway 26. The amount of mercury initially selected for use in the device must be such that the level thereof, when pump 35 is unenergized, is out of contact, or bridging engagement with electrical contacts 74 and 76. Under these conditions, the electrical circuit connected to binding posts 78 and 80 for control by the subject switching device is in open circuit condition.

When it is desired to complete the circuit to be controlled, it is merely necessary to afford current flow through the fluid conductor motor 35 as above explained. Such current flows in the aforedescribed parallel electrical paths afforded by the several legs of magnet core member 36 and including the mercury 34 in passageway 26 and reservoir 24. Since magnet core member 36 is a permanent magnet, magnetic flux is continually flowing in the abovedescribed magnetic path including the mercury 34 between the two sets of oppositely disposed magnet pole faces. As shown in Figures 1, 2 and 3, the magnetic flux flows through the mercury 34 at substantially right angles with respect to the lengths of the passageway 26 and the reservoir 24, while the current flows therethrough at substantially right angles to both the length of the passageway or reservoir and the direction of magnetic flux flow therethrough. As will be readily apparent to those persons skilled in the art, it is not mandatory for successful operation of the instant invention that the direction of magnetic flux flow and the direction of current flow be at right angles with respect to each other and with respect to the length of the passageway 26 or reservoir 24, but rather, it is merely necessary that there be an angular displacement therebetween to afford components of magnetic flux and current which flow at right angles with respect to each other and to the passageway or reservoir.

As is well understood in the art, whenever a magnetic field and an electric current at right angles with respect to each other are passed through a given point in an electrically conductive fluid, such as mercury, a force is exerted on such mercury tending to move the same in a direction which is at right angles to both the direction of the magnetic flux flow and the direction of current flow therethrough. Thus, with permanent magnet 36 providing a constant flow of magnetic flux through the mercury 34, the latter is moved or pumped along the passageway 26 or reservoir 24 whenever current is caused to flow between binding posts 62 and 58. It will be noted, that the electrical current flow between electrical pole faces 51 and 55 is so related with respect to the magnetic flux flow between magnet pole faces 40 and 46 that the mercury therebetween is moved or pumped upwardly in passageway 26. It will also be noted that the direction of current flow between electrical pole faces 50 and 54 is so related to the direction of magnetic flux flow between magnet pole faces 38 and 44 that the mercury within reservoir 24 is moved or pumped downwardly so as to aid or assist the pumping action between magnet pole faces 40 and 46. Such series arrangement of the pumping action causes the mercury within passageway 26 to be raised sufficiently to bridge electrical contacts 74 and 76 for completion of the electrical circuit connected to terminals 78 and 80. The opening 32 in partition wall 22 operates as a fluid spillway in permitting the forces of gravity to return the mercury to reservoir 24 during continuous energization of mercury pump 35. Thus, the mercury 34 is continuously circulated in the aforedescribed endless passageway during continuous energization of the fluid conductor motor 35, and since the mercury is pumped upwardly in passageway 26 against the forces of gravity, said passageway 26 is continually filled with electrically conductive fluid for continuous electrical bridging of contacts 74 and 76 during energization of pump 35. As will be apparent to those persons skilled in the art, the electrically conductive fluid 34 affords a low resistance connection between contacts 74 and 76 due to the electrical conductivity of the mercury and the large quantity thereof which is in engagement with contacts 74 and 76.

Upon termination of current flow between binding posts 62 and 58, the pumping action is immediately terminated whereupon the mercury or electrically conductive fluid 34 is returned, under the force of gravity, to its original position out of bridging engagement with contacts 74 and 76 as shown in Figures 2 and 3.

If it is desired to have the electrical circuit containing contacts 74 and 76 responsive to a second source of electrical energy, the magnetic flux flow through the mercury can be afforded by an electromagnet energized from any desired source such as a thermocouple, such arrangement having particular utility in certain heat responsive control apparatus.

The second embodiment shown in Figures 4, 5, 6 and 7, and designated with the numeral 100, is similar in certain respects to the first embodiment and comprises an enclosure 101 wherein a plastic body portion 102 and a plastic cover portion 104 are positioned. Body portion 102 is formed with four fluid passageways 106, 108, 110 and 112 and two fluid reservoirs 114 and 116. Passageway 106 is separated from passageway 108 by a partition wall 113 formed in body portion 102, while passageway 110 is separated from passageway 112 by a partition wall 115 also formed in body portion 102. A fluid passageway 118 formed in body portion 102 affords communication between the lower ends of all of the passageways 106, 108, 110 and 112 and both of the fluid reservoirs 114 and 116 (Figures 6 and 7). A groove or fluid channel 120 formed in cover portion 104 affords communication between the upper ends of passageways 106 and 112 and the reservoir 114. A similar channel 122, also formed in cover portion 104, affords communication between the upper ends of passageways 108 and 110 and reservoir 116.

Fluid conductor motor means 123 is disposed within body portion 102 and comprises oppositely disposed U-shaped magnet members 124 and 126 formed of magnetically permeable material and having magnet pole faces 124a, 124b, 126a and 126b forming part of the side walls of passageways 106, 112, 108 and 110 respectively, as shown in Figure 4. Either one or both of magnet members 124 and 126 may be a permanent magnet, or said magnet members may be operatively associated with electrical means (not shown) for rendering one or both of said members 124 and 126 electromagnets.

Interposed between the oppositely disposed magnet members 124 and 126 is a combination electric current and magnetic flux conductor 128 formed of material of good electrical conductivity such as copper. Conductor 128 is formed with an enlarged intermediate portion 128a and reduced end portions 128b and 128c interposed respectively between magnet pole faces 124a and 126a and between 124b and 126b. Reduced end portions 128b and 128c are of such size and are so disposed as to form a part of partition walls 113 and 115, respectively, of body portion 102. End portion 128b is formed with magnet pole faces 128d and 128e which form a part of the side walls of passageways 106 and 108 respectively; said pole faces 128d and 128e being exposed respectively to magnet pole faces 124a and 126a of magnet members 124 and 126. End portion 128c is formed with magnet pole faces 128f and 128g which are part of the side walls of passageways 110 and 112 respectively; said pole faces 128f and 128g being exposed respectively to magnet pole faces 126b and 124b of magnet members 126 and 124.

The difference in size between intermediate portion 128a and the reduced end portions 128b and 128c of conductor 128, affords a plurality of shoulders on intermediate portion 128a, providing electrical pole faces 128h, 128j, 128k, and 128m; said pole faces forming a part of the side walls of passageways 106, 108, 110 and 112 respectively. L-shaped electrical pole members 130, 132, 134 and 136 formed of material of good electrical conductivity such as copper, are positioned partially within body portion 102 and are formed with terminal portions which extend through insulating grommets positioned in openings formed in enclosure 101, as shown in Fig. 4. Pole members 130, 132, 134 and 136 are formed respectively with electrical pole faces 130a, 132a, 134a and 136a which form a part of the side walls of passageways 106, 108, 110 and 112 respectively. As shown in Figure 4, reduced end portion 128c of conductor 128 extends through an opening in the enclosure 101 and is provided with binding post or terminal means such as a nut threadably fixed thereto. It is thus seen that the aforedescribed construction provides four endless paths wherein fluid may be circulated from one of the reservoirs 114 and 116, through passageway 118, one of the fluid passageways 106, 108, 110 and 112 having oppositely disposed magnet pole faces and oppositely disposed electrical pole faces, and one of the fluid channels 120 and 122 to the respective reservoirs.

Disposed within body portion 102 in an elevated position with respect to the aforedescribed components of the fluid conductor motor, is circuit controlling means comprising conductors 140, 142 and 144. One end of each of the conductors 140 and 142 extends through an insulating grommet positioned within an opening formed in enclosure 101 and is provided with binding post or terminal means 140a and 142a for connection with an electrical circuit to be controlled. The other ends of conductors 140 and 142 are formed with electrical contacts 140b and 142b, respectively, positioned partially within passageways 108 and 110 respectively. The ends of conductor 144 are formed with electrical contacts 144a and 144b, positioned partially within passageways 106 and 112 respectively. An electrical contact 146 is positioned within partition wall 113 and is exposed to passageways 106 and 108 in alignment with contacts 140a and 144a. A similar contact member 148 is also positioned within partition wall 115 and is exposed to passageways 110 and 112 in alignment with contacts 142a and 144b.

As shown in Figures 6 and 7, mercury or other electrically conductive fluid is inserted within the aforedescribed fluid paths in an amount such that the initial level thereof, as determined by the force of gravity when the motor is unenergized, is above the electrical and magnetic pole faces of the fluid conductor motor 123 but below the electrical contacts positioned within such passageways.

In order to electrically insulate the mercury from the magnet pole faces, I prefer to coat each of the aforedescribed magnetic pole faces with a suitable plastic or ceramic insulating material. Also, since mercury reacts chemically with copper of which all of the current carriers are constructed, I prefer to coat each of the electrical pole faces with inert material such as rhodium to prevent amalgamation of the mercury and copper.

The operation of the second embodiment shown in Figures 4, 5, 6 and 7 will be described in its relationship to the fuel burning apparatus of Figure 8. In this regard it is to be noted that binding post 128c is connected to ground to thereby complete the electrical circuits as shown and as will now be described.

Referring to Figure 8, it shows a fluid flow control device 150 formed with a fluid inlet 152 having connection with a fluid conduit 154 and a fluid outlet 156 having connection with a fluid conduit 158 constituting a main burner fuel supply manifold as will hereinafter become apparent. Flow-control device 150 further comprises safety shut-off means having a safety shut-off valve 162 biased, by a compression spring 164 toward flow-preventing position relative to a valve seat 156; there being electromagnetic means 168 comprising a magnet core member 170, an energizing winding 172 and an armature 174 for retaining flow-control valve 162 in flow-permitting position against the force of spring 164 whenever armature 174 is in attracted position relative to core member 170 during energization of winding 172. A reset stem 176 biased to retracted position by a compression spring 178, carries a flow-interruption valve disc 180 and is moveable against the force of spring 178 to move valve member 162 to its flow-permitting position and armature 174 to its aforementioned attracted position; such movement of stem 176 causing flow-interruption valve disc 180 to engage a valve seat 182 for preventing fuel flow to conduit 158 as will hereinafter appear. A compression spring 184 aids in affording a lost-motion connection between flow-interruption disc 180 and reset stem 176 to permit relative movement therebetween. A pilot fuel supply opening 186 is provided between valve seats 166 and 182 and is in communication with a pilot fuel supply conduit or manifold 188 fixed to flow-control device 150.

A plurality of main fuel burners 190a, 190b, 190c, 190d, and 190e are afforded fuel supply from manifold 158, by means of conduits 192a, 192b, 192c, 192d, and 192e, respectively, as shown. Operatively positioned in the latter mentioned conduits, are valve devices 194a, 194b, 194c, 194d and 194e, respectively, which may be either manually or electrically operated, as desired, to afford individual control over the heating operation afforded by each of the aforementioned main fuel burners. It is realized that such main fuel burners, if desired, may be positioned in heating relation to separate and independent enclosures to be heated, and separate and independent thermostatic control of the temperature therewithin be effected through the aforementioned flow-control valves 194a, 194b, 194c, 194d and 194e.

An ignition or pilot burner is provided for each of the main fuel burners; there being ignition burners 196a, 196b, 196c, 196d and 196e juxtaposed with respect to main burners 190a, 190b, 190c, 190d and 190e respectively. Ignition burner fuel supply conduits 198a, 198b, 198c, 198d and 198e afford fuel flow to burners 196a, 196b, 196c, 196d and 196e, respectively, from the pilot fuel supply conduit or manifold 188. Juxtaposed with respect to each of the ignition burners for heating thereby, are thermoelectric generators 200a, 200b, 200c, 200d and 200e respectively as shown in Figure 8 of the drawings.

The circuit controlling device shown in Figures 4, 5, 6 and 7 is shown, more or less schematically, in Figure 8. Although like reference characters are used to designate corresponding parts in Figures 4, 5, 6, 7 and 8, reference should be had to the above description of the second embodiment for an understanding of the specific details of construction.

A lead wire 202 affords connection of one element of thermoelectric generator 200a with conductor 142 of switching device 100 while a lead wire 204 affords connection of the other element thereof with one end of winding 172 of electromagnetic means 168. The other end of winding 172 is connected to conductor 140 of switching device 100 by a lead wire 206. One element of thermoelectric generator 200b is grounded while the other element thereof is connected by means of a lead wire 208 to electrical pole member 134. Thermoelectric generator 200c has one element grounded while the other element thereof is connected to electrical pole member 136 by a lead wire 210. One of the elements of thermoelectric generator 200d is connected to electrical pole member 130 by a lead wire 212 while the other element thereof is grounded. Another lead wire 214 affords connection of one of the elements of generator 200e with electrical pole member 132, the other element thereof being grounded as shown in Figure 8.

In order to effect ignition of the main burners of the apparatus shown in Figure 8, it is first necessary to ignite all of the ignition burners. To accomplish this while safety shut-off valve 162 is in flow-preventing engagement with valve seat 166, it is first necessary to depress reset stem 176 for movement of valve 162 to its flow-permitting position and armature 174 to its attracted position relative to core member 170. Pilot burners 196a, 196b, 196c, 196d and 196e may then be ignited by means of a match, or by automatic means such as electroresponsive igniters (not shown), the energization of which is responsive to operation of reset stem 176. Such movement of reset stem 176 causes flow-interruption valve 180 to engage valve seat 182 for prevention of fuel flow to the main burners during fuel flow to ignition burners 196a, 196b, 196c, 196d and 196e through pilot opening 186 and conduit 188.

Ignition of pilot burner 196b effects heating of the hot junction of thermoelectric generator 200b for generation of an electric potential which causes current to flow through lead wire 208, pole member 134, the mercury within passageway 110 between electrical pole faces 134a and 128k, and reduced end portion 128c of member 128 back to generator 200b through ground. In like manner, ignition of pilot burners 200c, 200d and 200e causes each of the generators associated respectively therewith to afford current flow through the fluid passageways 112, 106 and 108 respectively. The current afforded by generator 200c flows through the mercury in passageway 112 between electrical pole faces 136a and 128m, while the current afforded by generator 200b flows through the mercury in passageway 106 between electrical pole faces 130a and 128h, and the current afforded by generator 200e flows through the mercury in passageway 108 between electrical pole faces 132a and 128j. In each of these circuits the current is returned to the respective thermoelectric generator through reduced end portion 128c of conductor 128 and the common ground. Such current flow through the mercury in the several passageways coacts, as above set forth with respect to the first embodiment, with the magnetic flux afforded in the mercury by magnet members 124 and 126. Such coaction causes the mercury in passageways 106, 108, 110 and 112 to be pumped upwardly so as to electrically bridge contacts 144a and 146, contacts 146 and 140b, contacts 142b and 148 and contacts 148 and 144b respectively. As above explained, the mercury is continuously pumped or circulated in the abovedescribed fluid paths for continuous bridging engagement of the respective electrical contacts during heating of the thermoelectric generators.

Bridging of all of the sets of contacts effects completion of the energizing circuit for winding 172. Since ignition burner 196a was previously ignited, the electrical potential developed by heating of generator 200a causes current to flow through lead wire 202, conductor 142, the mercury between contact 142b and contact member 148, the mercury between contact member 148 and contact 144b, conductor 144, the mercury between contact 144a and contact member 146, the mercury between contact member 146 and contact 140b, conductor 140, lead wire 206, winding 172, and lead wire 204. Such current flow through winding 172 causes magnetic flux flow in core member 170 and armature 174 for retention of safety shut-off valve 162 in its flow-permitting position against the biasing force of compression spring 164.

With safety shut-off valve 162 thus held in flow-permitting position, reset stem 176 may be released, thereby moving flow-interrupting disc 182 to its flow-permitting position. In this manner, fluid fuel is permitted to flow through flow control device 150, manifold 158 and the various main burner conduits to afford fuel flow to each of main burners 190a, 190b, 190c, 190d and 190e. The fuel thus emitted at the various main burners is ignited by the respective pilot burners.

In the event of outage of pilot burner 196a, electromagnetic winding 172 is immediately deenergized, thereby permitting compression spring 164 to return safety shut-off valve 162 to its flow-preventing position. In this manner fuel flow to all of the pilot burners and all of the main burners is automatically interrupted by cooling of generator 200a, the source of energizing current for winding 172.

In the event any one of generators 200b, 200c, 200d, and 200e should be cooled as by extinguishment of the respective pilot burner flame, the electric current flow through the mercury in the respective fluid passageway of the switching device is immediately terminated, whereupon the pumping or circulating force on the mercury is likewise terminated. Under these conditions, gravitational forces return the mercury in the particular passageway to its initial position out of engagement with the respective set of electrical contacts. In this manner, the energizing circuit for electromagnetic winding 172 is interrupted, whereupon compression spring 164 is permitted to return safety shut-off valve 162 to its flow-preventing position for termination of fuel flow to all of the main and ignition burners as set forth above.

Although I have shown and described certain specific embodiments of my invention, I am fully aware that many modifications thereof are possible. My invention, therefore, is not to be restricted except insofar as necessitated by the prior art.

I claim:

1. In combination, a body of electrical insulating material formed with passage means having spaced vertical actuating and reservoir legs, a transverse reservoir leg connecting the lower ends of said vertical legs, and means affording communication between the upper ends of said vertical legs, an electrically conductive fluid normally disposed in said transverse leg and in the lower portions of said vertical legs, a U-shaped permanent magnet having spaced horizontal arms each terminating in a pole face disposed in one side of a lower portion of a separate one of said vertical legs, means electrically insulating said pole faces from said fluid, an electrical and flux conducting member having spaced pole face portions each disposed in a separate one of said vertical legs transversely opposite said magnet pole faces, means electrically insulating said member pole faces from said fluid, said member having a separate electrode portion within each vertical passageway leg in contact with the fluid therein, said member being adapted to be connected to one terminal of direct current source means, a separate electrode in each of said vertical legs opposite the member electrode portion therein and also in contact with said fluid, said electrodes and electrode portions being transversely alined at an angle to the alinement of said pole faces, and said electrodes being adapted for connection to another terminal of direct current source means, said permanent magnet being operable to cause flux flow transversely through the fluid between the opposing pole faces in each vertical leg and through said electrical and flux conducting member, direct current flow from said source means transversely through the fluid in each of said vertical legs between the electrode and electrode portions therein effecting, by interaction with the permanent magnet flux in each vertical leg, pumping of said fluid upwardly in said actuating leg and downwardly in said reservoir leg.

2. In combination, a body of electrical insulating material formed with a passage means having four spaced vertical actuating legs, at least one vertical reservoir leg, a transverse leg connecting the lower ends of said actuating and reservoir legs, and means affording communication between the upper ends of said actuating and reservoir legs, an electrically conductive fluid normally disposed in said transverse leg and in the lower portions of said vertical legs, a first U-shaped permanent magnet having spaced horizontal legs each terminating in a pole face disposed in one side of a lower portion of a separate one of said actuating legs, a second U-shaped permanent magnet having spaced horizontal legs each terminating in a pole face disposed in one side of a lower portion of a separate one of the remaining actuating legs, means electrically insulating said pole faces from said fluid, an electrical and flux conducting member having four spaced pole face portions each disposed in a separate one of said actuating legs transversely opposite the magnet pole face therein, means electrically insulating said member pole faces from said fluid, said member having four separate electrode portions within each actuating leg in contact with the fluid therein, said member being adapted to be connected to one terminal of direct current source means, a separate electrode in each of said actuating legs opposite the member electrode portion therein and also in contact with said fluid, said electrodes and electrode portions being transversely alined at an angle to the alinement of said pole faces, and each of said electrodes being adapted for connection to another terminal of direct current source means, said permanent magnets being operable to cause flux flow transversely through the fluid between the opposing pole faces in each actuating leg and through said electrical and flux conducting member, direct current flow from said source means transversely through the fluid in each of said actuating legs between the electrode and electrode portions therein effecting, by interaction with the permanent magnet flux in each actuating leg, pumping of said fluid upwardly in each actuating leg and downwardly in the reservoir leg.

References Cited in the file of this patent

UNITED STATES PATENTS

| | | |
|---|---|---|
| 1,747,044 | Bainbridge | Feb. 11, 1930 |
| 1,773,036 | Fitzgerald | Aug. 12, 1930 |
| 2,158,009 | Hufnagel | May 9, 1939 |
| 2,183,855 | Mansky | Dec. 19, 1939 |
| 2,686,474 | Pulley | Aug. 17, 1954 |
| 2,748,710 | Vandenberg | June 5, 1956 |
| 2,787,219 | Werner | Apr. 2, 1957 |